Figure 9:
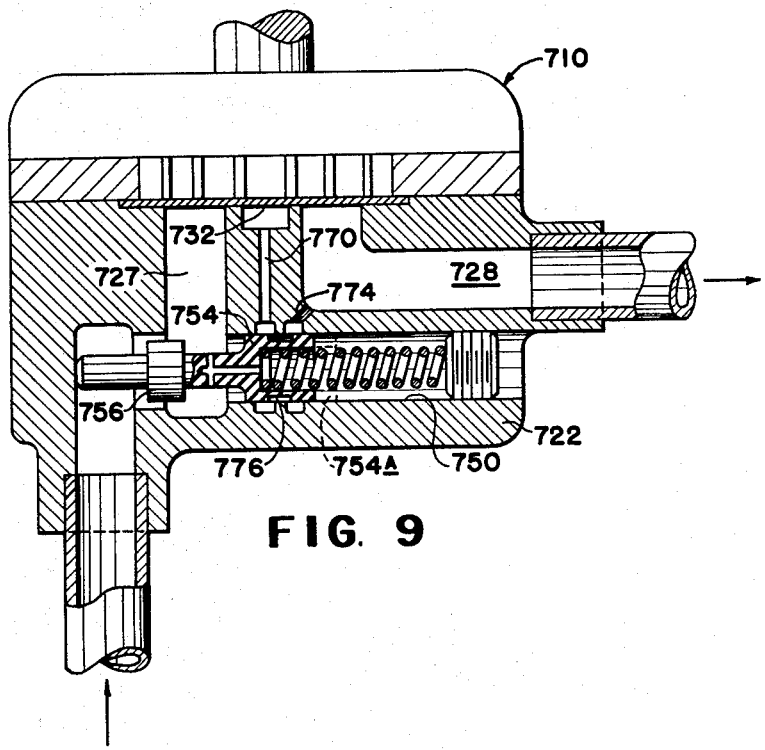

March 30, 1965 W. E. MILLER 3,175,468
FLUID MOTOR WITH DELAYED PRESSURE LOADING
Filed April 5, 1962 3 Sheets-Sheet 1
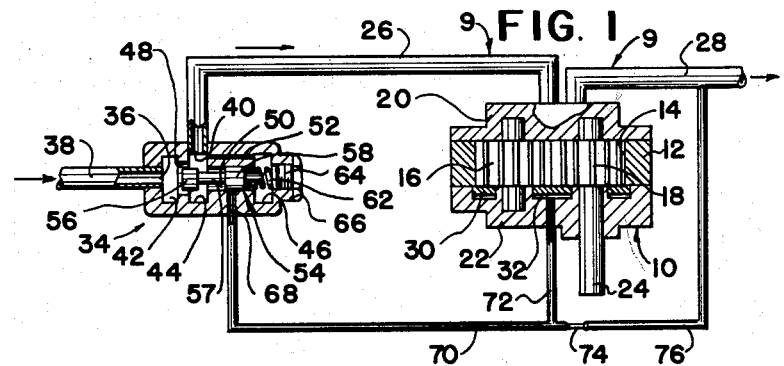
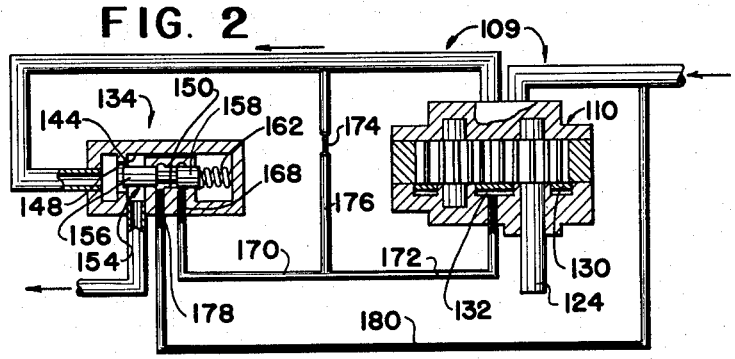
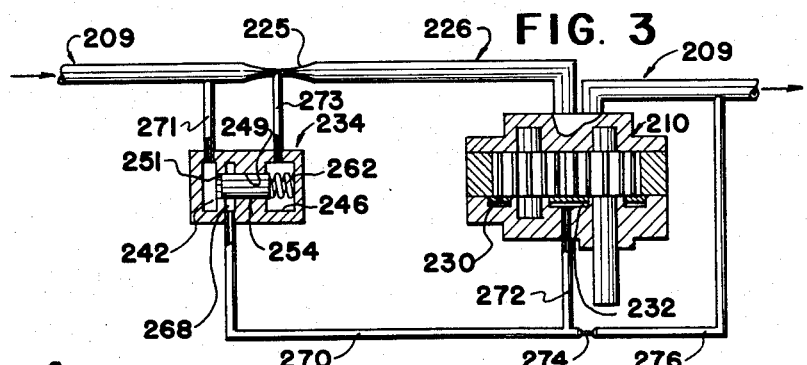
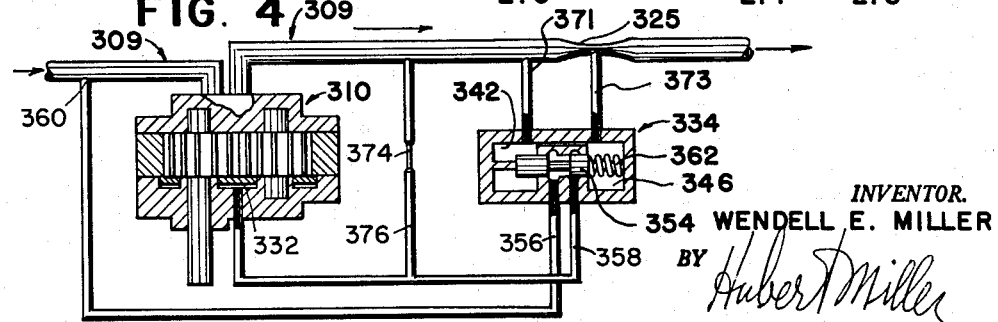
INVENTOR.
WENDELL E. MILLER
BY Hubert Miller
ATTORNEY

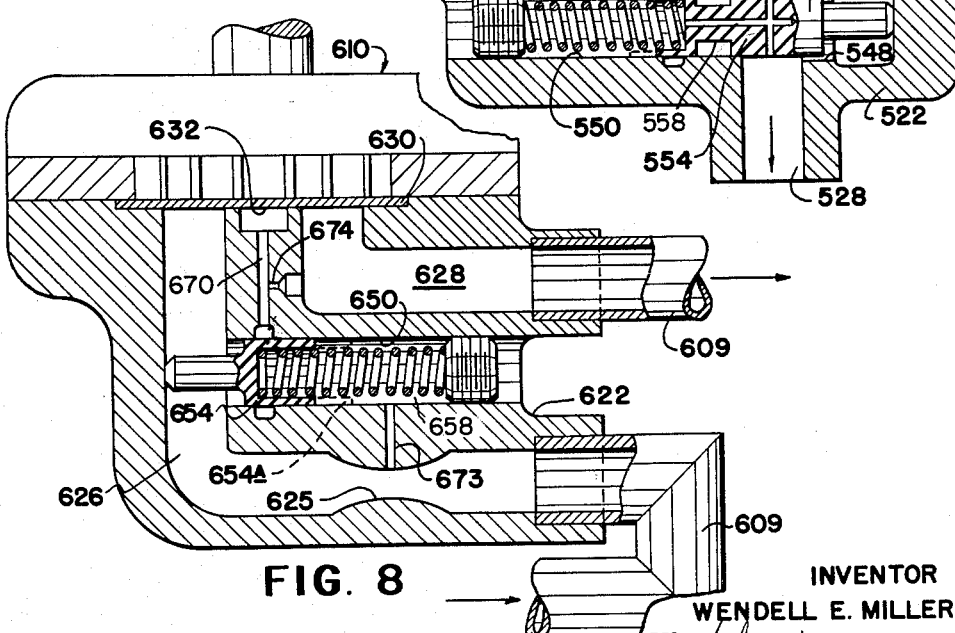

March 30, 1965 W. E. MILLER 3,175,468
FLUID MOTOR WITH DELAYED PRESSURE LOADING
Filed April 5, 1962 3 Sheets-Sheet 3

INVENTOR.
WENDELL E. MILLER
BY
ATTORNEY

United States Patent Office 3,175,468
Patented Mar. 30, 1965

3,175,468
FLUID MOTOR WITH DELAYED PRESSURE LOADING
Wendell E. Miller, Hutchinson, Kans., assignor to The Cessna Aircraft Company, Wichita, Kans., a corporation of Kansas
Filed Apr. 5, 1962, Ser. No. 185,331
21 Claims. (Cl. 91—87)

This invention relates generally to hydraulically driven motors of the fixed displacement rotary type, and more particularly to a system and means for automatically controlling the pressure loading of such a motor.

In a pressure loaded motor of conventional construction, fluid input pressure urges a pressure plate, bushing, or other sealing member against the surfaces of the rotor means in the motor to reduce fluid leakage from the high pressure side of the rotor chamber to the low pressure or discharge side of that chamber. This pressure is applied to the sealing member or plate the instant motive fluid is introduced to the motor. Consequently high static friction exists between the sealing face of the plate or sealing member and the confronting portion of the rotor means in the motor before the motor has started its load. As a result, such a pressure loaded motor has a very low starting torque which is a very undesirable feature.

It is a primary object of my invention to provide a pressure loaded rotary type fluid motor which not only has high starting torque but also has good volumetric efficiency at running speeds. More specifically, the invention provides a mechanism which delays the build up of sealing pressure in a pressure loading zone located behind the sealing member until the motor has performed its load starting task. The starting torque of the motor is thus materially increased because, with little or no pressure in the pressure loading zone, there is virtually no static frictional contact between the sealing member and the rotor. As the motor subsequently approaches operating speed, the sealing member is urged into sealing engagement with the rotor faces so as to insure the high volumetric efficiency above indicated.

An additional object is to provide a system and means for automatically controlling the pressure loading of a rotary motor in a manner to delay the application of loading pressure to the sealing member or plate until after the motor has performed its load starting task, and to subsequently apply full loading pressure to the sealing plate as the motor approaches operating speed. Without pressure loading, the motor thus has very high starting torque with a somewhat lowered volumetric efficiency during the load starting operation, and achieves high volumetric efficiency after the load has been started.

It is a further object to provide a pressure loading control device for connection to a rotary motor, which may be automatically actuated either by the motive fluid supplied to the motor or by the fluid discharged from the motor to delay the application of loading pressure to the rotor faces of the motor until after the motor has performed its load starting function, and to thereafter apply full loading pressure to the sealing member or plate.

The invention, together with other objects, will be more clearly understood when the following description is read in connection with the accompanying drawings, in which:

FIGURE 1 is a transverse sectional view of a pressure loaded fluid motor and a means for delaying the pressure loading in accordance with the present invention, the motor and delay means being in separate units.

FIGURES 2, 3, and 4 are each transverse sectional views similar to FIGURE 1 but with modifications in the way the separate units referred to are related and connected;

FIGURE 5 is a face view and FIGURE 6 is a sectional view on the lines 6—6 of FIGURE 5, showing a modification in which the motor and delay means are consolidated in a unitary structure; and FIGURES 7, 8 and 9 are sectional views similar to FIGURE 6 but showing further modifications in the arrangement and connections of the consolidated structure.

*FIG. 1 construction*

More particularly in FIGURE 1, there is illustrated a fluid line generally designated 9 having a pressure loaded fluid motor 10 interposed therein including a central or main body housing 12 hollowed to define a gear chamber 14 in which two meshing gears 16 and 18 are arranged to rotate. The gears 16 and 18 are fast to shafts journaled in end plate members 20 and 22, the gear 18 being carried by a motor drive shaft 24.

In a conventional way, the end plate 20 includes an internal passage (not shown) forming an inlet which communicates with the gear chamber 14 at one side of the gears 16 and 18 and a discharge outlet which communicates with the gear chamber at the opposite side of the gears 16 and 18. The inlet and outlet respectively are connected in said line respectively to an inlet conduit portion 26 and an outlet conduit portion 28.

The gear motor 10 is of the pressure loaded type in which a sealing member or plate 30 is urged against the side faces of the gears 16 and 18 during normal operative speed rotation thereof by fluid pressure admitted to a pressure loading zone 32 defined between the sealing plate 30 and the confronting inner face of the end plate 22.

The invention provides means to materially reduce the pressure in the pressure loading zone 32 at slow rotational speed conditions of the gears 16 and 18, such as when started. Illustrative of one form of such means is a sealing plate fluid biasing pressure control device generally designated 34. A purpose of the pressure reduction is to insure that the torque delivered to the shaft 24 will be as high as possible during start-up conditions by insuring that the static friction between the sealing plate 30 and the gears 16 and 18 is reduced to a minimum.

The sealing fluid pressure control device 34 is substantially cylindrical and includes an end inlet opening 36 which is connected to a portion 38 of the fluid line 9 which receives fluids from a supply pump (not shown). A side opening 40 in the sealing plate fluid pressure control device 34 communicates directly with the inlet conduit portion 26 of the line 9.

The interior of the sealing plate fluid pressure control device 34 includes three spaced apart interior large diameter portions 42, 44, and 46. The portions 42 and 44 are connected by a small diameter bore portion 48 and the portions 44 and 46 are connected by a longer small diameter portion 50. An equalizer passage connection 52 extends between the large diameter portions 46 and 44 at a location radially outwardly from the center thereof.

A control spool member generally designated 54 is arranged for axial sliding movement within the sealing plate fluid pressure control device 34. The spool member 54 includes a large diameter head 56 which is disposed within but which is formed with a slightly smaller diameter than the small diameter bore 48. The control spool member 54 further includes an intermediate portion 57 which is slightly smaller in diameter than the head 56. The spool member 54 further includes an intermediate large diameter portion 58 which reciprocates in the bore 50 and is connected to the head 56 by the intermediate portion 57. A coil spring 62 in the bore portion 46 fits around the outer end portion 64 of the spool member and is disposed between the valve portion 58 and plug 66 which is threaded into the end of the control device 34.

FIG. 1 operation

In operation, hydraulic fluid under pressure enters through the conduit portion 38 of the fluid line 9 into the chamber 42. An annular clearance space between the head 56 of the spool member 54 and the interior of the bore 48 permits a predetermined flow of fluid into the chamber 44 and to the inlet conduit portion 26 of the line 9. If the gears of the motor fail to move because of a load imposed on the motor drive shaft 24, a static pressure is created in the chambers 42 and 44 and in the conduit portions 26 and 38 of the line 9. This pressure does not change the position of the spool member 54 from that shown in the drawings because of the clearance space between the bore 48 and the head portion 56 of the valve. As the load on the shaft 24 is reduced or overcome, flow begins through the conduit portion 38 and through the clearance space into the chamber 44 in the inlet conduit portion 26 of the line. However, the flow is considerably less than full volume, and there is no pressure fluid flowing through conduit 70 to the pressure loading zone 32, and hence no pressure loading.

As the flow increases beyond the predetermined capacity of the clearance space between the head 56 and the bore 48, there is a pressure drop in the chamber 44, creating a like drop in the equalizer connection 52 and in the spring-containing bore portion 46. The resulting differential pressure on the spool member end causes the member 54 to begin compressing the spring 62.

Accordingly, the large diameter spool portion 58 uncovers an opening 68 which is in the wall of the portion 50 and which communicates through bypass conduits 70 and 72 to the pressure loading zone 32. This permits the pressurized fluid in the chamber 44 to flow into the opening 68 and through the conduits 70 and 72 into the fluid pressure loading zone 32 behind the plate 30 to urge it against the end faces of the gears 16 and 18 into sealing engagement therewith.

Consequently as long the motor runs at operating speed, a sealing or loading pressure in the zone 32 is maintained which is greater than the average pressure applied to the opposite side of sealing plate 30 by fluid pressure in the gear chamber.

If flow entering the line 9 through the conduit portion 38 is reduced due to slowing down or stopping of the motor, the pressures in the chamber 42 and 44 tend to equalize and the energy in the spring 62 will then return spool member 54 to the starting position. This closes the opening 68 and the conduit 70. Liquid in the pressure loading zone 32 can, if excessive, be bled through an orifice 74 interposed in a conduit 76 which is connected to the conduit 72, and the outlet conduit portion 28 of the line 9 at a point downstream of the motor 10. Other means of restrictively reducing the pressure can equally well be provided. Thus, the orifice 74 is illustrative only, rather than being essential in all cases. At low speeds the internal pump leakage, for example, will satisfactorily bleed off the loading zone pressure to the low pressure side of the motor.

With the spool member 54 in the position shown in FIGURE 1 of the drawings, the pressure in the pressure loading zone 32 is nil. Hence the static friction of the plate 30 against the gears 16 and 18 is relieved during starting of the motor.

When the motor is again permitted to rotate the starting torque will be high due to the lessened amount of the frictional losses caused by the plate 30.

FIG. 2 construction

In the embodiment of FIGURE 2, the sealing plate fluid biasing pressure control device 134 is located in the motive fluid line 109 at a point downstream of the gear motor 110. As in the FIG. 1 embodiment, however, a large diameter spool portion 158 in the control device 134 controls an opening 168, which is in the wall of an interior portion 150, and which communicates through two series connected conduits 170 and 172 to the pressure loading zone 132 behind a gear sealing plate 130. As in the FIG. 1 embodiment, liquid under undesirably excessive pressure in the zone 132 behind the plate 130 may be bled into the line 109 downstream of the motor 110 by means of an orifice 174 provided in a conduit 176 which connects the conduit 172 and the line 109.

A head 156 on a valve spool member 154 in FIGURE 2 projects in an upstream direction with respect to the fluid flow delivered from the motor 110 through the line 109, to the control device 134. As the load on output shaft 124 of the motor 110 is reduced or overcome, flow begins between the discharge chamber of the motor and the device 134, so that discharge fluid flows through a clearance space between the out side diameter of the head 156 and the interior of a slightly larger diameter bore 148 in the device 134. A pressure drop occurs in a chamber 144, creating a like drop through and in an equalizer connection and in an enlarged bore portion containing a return spring 162. As flow increases, the resulting differential pressure on the spool member 154 causes the portion 158 thereof to uncover a side opening 168 in the bore 150. Another side opening 178 in the bore 150 delivers thereto fluid through a conduit 180 connected at a point in the line 109 upstream of the motor 110. Thus full upstream pressure is communicated through the conduit 180, bore 150, and series connected conduits 170 and 172 into the pressure loading zone 132 for sealing the member 130 against the gears in the motor 110. Thus full upstream pressure is communicated through the conduit 180, bore 150, and series connected conduits 170 and 172 into the pressure loading zone 132 for sealing the member 130 against the gears in the motor 110. In the embodiment of FIGURE 2 the return spring 162 operates in the manner of the preceding embodiment to force the spool member 154 to close the side opening 168 when the line flow is reduced due to slowing down or stopping of the motor 110.

FIG. 3 construction

In the embodiment of FIGURE 3, the motive fluid line 209 has a fluid inlet portion 226 containing a pressure differential creating venturi 225, and is connected to the inlet chamber of a pressure loaded gear motor 210. A by-pass consisting of conduits 271, 270 and 272 connects a valve control device 234 with the pressure loading or sealing zone 232 of the motor to apply a sealing force to the outer surface of a sealing plate 230.

In operation, hydraulic fluid enters through the by-pass conduit connection 271 into a chamber 242 within the device 234 and simultaneously enters a chamber 246 from the throat of the Venturi 225 through a conduit 273. If the rotor of the motor 210 remains stationary because of incapacity to move the load, equal static pressure exists in the chambers 242 and 246, and a valve element 254 mounted in a bore 249 between the two chambers is maintained in a state of hydraulic balance. A valve return spring 262 within the chamber 246 thrusts against the confronting end of the valve element 254 to bias the valve element into a position completely blocking an inlet port 251 in the adjacent wall of the chamber 242.

As the motor 210 of FIGURE 3 begins to run, the initial rate of flow through the Venturi throat is insufficient to materially change the position of the valve spool 254, and so it stays in its blocking position, preventing application of loading pressure in zone 232.

However, as the motor 210 approaches operating speed, the resulting fluid flow through the venturi 225 lowers the pressure in chamber 246 to a value less than the pressure in chamber 242. The differential of pressure thus exerted between opposite ends of the valve element 254 causes it to move to the right compressing the spring 262 and at the same time opening the port 251 so that upstream pressure fluid flows to pressure loading zone 232 through chamber 242, port 251, an annular groove 268, and the conduits 270 and 272. The sealing member 230 is thereby forced into sealing engagement with the adjacent faces of the motor gears, which engagement continues so long as the motor 210 runs approximately at full operating speed.

When the rotor speed reduces or stops, so that the venturi 225 develops insufficient differential pressure in the connections 271 and 273 to keep the spring 262 compressed, the valve element 254 resumes its starting position blocking the port 251. When this occurs liquid in the pressure zone 232 will be bled through an orifice 274 to reduce the pressure against the plate 230 and hence substantially eliminate the friction between the sealing plate 230 and the rotor in the motor 210; the orifice 274 is connected by a conduit 276 to the downstream side of the line 209, and continuously restrictively drains the conduit 272.

FIG. 4 construction

In the figure construction, the loading zone control valve device is connected to the motor discharge portion of conduit 309. Conduit 373 connects Venturi throat 325 to chamber 346, and a conduit 371 connects chamber 342 to motor discharge line 309 at a point upstream of the Venturi throat.

As in previously described constructions, the valve spool prevents pressure fluid from reaching the pressure loading zone until after the motor rotor or rotors have reached operating speed. When operating speed is reached different pressures in chambers 342 and 346, created by the Venturi throat, move spool 354 to the right against spool return spring 362. The central spool groove then connects the adjacent ends of conduits 356 and 358, which then serve to conduct pressure fluid from upstream point 360 in supply line 309 to the pressure loading zone 332 of the motor. When the motor rotor slows or stops, pressure in zone 332 is relieved through line 376 having an interposed restrictive orifice 374.

FIGS. 5 and 6 construction

In the unitary motor and valve construction of FIGURES 5 and 6, a single housing 10 is shown in which the loading or sealing control valve assembly is consolidated and which consists of a body section 412, an end plate 420 and opposite end plate 422. The body 412 has a chamber containing the meshing gears 416 and 418. A motor output shaft 424 extends through the gear chamber and is fixed to the gear 416. The motive fluid line 409 is supplied by a pump 411 and a fluid inlet connection 426 communicates pressure fluid from said line to a chamber 427 which is on the pressure side of and which communicates pressure fluid to the gears 416 and 418. Fluid from the fluid discharge side of the gears 416 and 418 is delivered by a low pressure discharge outlet 428 into said line 409.

A valve bore 450 in the end plate 422 contains an axially slidable valve spool 454 having a shouldered portion on which a land 456 is carried. The land 456 has an integral extension 457 serving as a limit stop to forward movement of the spool land. Land 456 projects partially into and is smaller in diameter than a port 448, which connects ducts 426 and 427. An axial passage 459 and an intersecting cross-passage 461 in the valve spool 454 establish a connecting path between the chamber 450 and the chamber 427 on the inlet side of the gear chamber.

A coil spring 462 seats within a socket portion 464 of the valve spool 454 and bears against a bore plug 466 to normally maintain the spool 454 in the position shown, when the motor is not operating.

The annular clearance space between the outside periphery of the land 456 and the port 448 creates sufficient restriction to flow that a pressure differential between the inlet chamber 426 and the chamber 427 creates a force which moves the valve spool into the dotted line position 454a, after the motor has reached a normal operating speed. In this new spool position pressure chamber 427 is connected directly with the pressure loading zone 432 through a spool groove 469 and a connecting internal duct 470. Loading or sealing pressure is thus applied to the outer surface of sealing plate 430 only after the motor has attained operating speed, and urges the sealing plate 430 into sealing engagement with the gears 416 and 418 in the manner of the preceding embodiment.

When the differential reduces so that the valve spool is returned to its solid line position by spring 462, the pressure plate 430 is released from its sealing engagement because pressure fluid is drained from zone 432 through internal duct 470, through an orifice 474 into the low pressure discharge outlet 428.

FIG. 7 construction

The construction and operation of the FIG. 7 device is very similar to that of the FIG. 6 device, the primary difference being that the valve spool is moved by fluid pressure in the motor discharge duct 557 instead of by pressure in the motive fluid inlet duct 526.

So long as the motor is not operating or is operating at slow or starting speed, there is no loading pressure in pressure loading zone 532 (indicated by a heavy black line), and hence virtually no friction between the sealing plate 530 and the rotor or gears of the motor.

When the motor attains operating speed restricted fluid flow between the periphery of valve spool land 556 and the surrounding port 548 creates sufficient pressure in discharge duct 557 to move the valve spool to broken line position 554A. In this position of the spool, groove 558 connects pressure loading zone 532 with motive fluid inlet duct 526 through a duct 523, a connected groove 524, and an internal duct 570. Sealing pressure is thus applied to the outer surface of sealing plate 530 only after the rotor or gears of the motor have performed their load starting task and have reached operating speed. The result of this delayed sealing force is high motor starting torque.

Provision of a separate drain passage is not essential and the user can rely solely on internal motor leakage to bleed off the fluid pressure from the pressure loading zone 532; in that case, the draining will occur at a somewhat slower rate and, from motor to motor, the rate of course will not be predeterminable. If desired a calibrated bleed orifice 574 may be provided between the duct 570 and discharge passage 528.

If the end plate 522 and the valve 554 are so made that they incorporate a predetermined minute clearance between the interface of contact of the valve head 556 and the cooperating end portion of the bore 550, drainage, from the zone 532 into the outlet 528, can be accomplished with essentially the same accuracy of control as with the separate bleed passage. In this way the separate bleed passage can be omitted, and a sufficient drainage rate still provided.

FIG. 8 construction

Motor housing 610 is provided with a motive fluid inlet passage 626 and a discharge passage 628. A Venturi throat 625 is provided in inlet passage 626.

A piston type loading pressure control valve 654 floats in a plugged bore 650, and controls flow of sealing pressure fluid from inlet passage 626 through internal duct 670 to pressure loading zone 632 at the outside surface of sealing plate 630. An internal duct 673 affords communication between Venturi throat 625 and the bore chamber.

By means of a compression spring, valve 64 is maintained at the left end of its stroke when the motor is operating at slow or starting speeds, in which position it isolates pressure zone 632 from high pressure fluid, thus allowing the motor to start without any material friction between plate 630 and the rotor.

As rotor speed increases to normal, the rate of fluid flow through Venturi throat 625 increases materially. The Venturi creates a pressure drop in chamber 658. Pressure differential in inlet 626 and in chamber 658 moves plunger valve 654 to the right and allows fluid from inlet 626 to enter pressure loading zone 632 and apply full sealing force against plate 630.

When the motor slows or stops the pressures in inlet 626 and chamber 658 are equalized, and the spring returns valve 654 to its starting position. Pressure fluid in zone 632 either leaks into discharge passage 628, or may be drained into that passage by an orifice 674.

FIG. 9—Loading zone drainage

The FIG. 9 construction differs from the FIG. 6 construction only in the location of loading drainage orifice 774. Instead of continuously bleeding fluid from duct 770, orifice 774 connects duct 770 and discharge passage 728 only after the motor has slowed or stopped, and plunger valve 754 has returned to its normal at rest position.

By providing the mechanism of the present invention, it is possible to eliminate pressure loading during starting, resulting in high starting torque being delivered to the motor shaft. There is no sacrifice of volumetric efficiency during normal operating speeds of the motor and the transition is readily effected permitting high torque during starting periods by relieving the fluid pressure biasing against the sealing member and the gears so long as there is low rotational speed of the gears and low fluid flow through the motor.

It should be appreciated that the construction of FIGS. 5–9 are distinctive primarily because they are built into the motor housing instead of being separate therefrom.

From the above explanation and description, it is seen that a by-pass line of limited flow is provided which by-passes the motor in the main line; the by-pass line has a tapped point connected to the pressure loading zone of the motor to introduce a sealing pressure therein. It is also seen that a valve and a restriction are provided in said by-pass line on opposite sides of the tapped point for regulating the flow so as to control the pressures developed therebetween.

The preferred arrangement is to have the valve and restriction series-connected in that order, with the valve opening automatically to increase loading pressure in response to increasing flow rate in the main line. If, with respect to the tapped point, the restriction is placed on the upstream side and the valve on the downstream side, the user can with slight modification provide a valve action automatically decreasing the valve opening as the motor flow increases, thereby increasing the pressure in the loading pressure zone so as to increase sealing with speed as required. This modification is somewhat more indirect however, requiring careful calibration and adjustment, and the constructions herein illustrated are arranged with the valve and restriction series-connected in that order.

While certain preferred embodiments of the invention have been shown and described in detail to illustrate the application of the invention principles, it should be understood that those skilled in the art may embody the invention otherwise without departing from such principles. Thus, to facilitate the low friction, reduced speed operation of the motor, the internal fluid leakage of the motor can be relied upon alone to bleed down the pressure in pressure loading zone. Alternatively this leakage can be augmented through provision of a separate leakage passage or special drain passages such as passages 74, 174, 774, etc. leading to the low pressure or discharge side of the motor.

Having described the invention with sufficient clarity to enable those familiar with this art to construct and use it, I claim:

1. In a hydraulic system which includes a high pressure fluid delivery line and fluid driven pressure sealed motor of the rotary type having rotor means therein, said motor comprising a rotor chamber containing said rotor means, and a sealing member having one sealing face adjacent surfaces of the rotor means and its other face defining one side of a pressure loading zone, said system also including separate fluid inlet lines, one connected to the rotor chamber and one connected to the pressure loading zone, the improved construction which consists of: a pressure responsive flow controlling valve interposed between and in communication with the fluid delivery line and the two fluid inlet lines; and means in said valve responsive to a predetermined volume flow of pressure fluid from the delivery line through the valve to the rotor chamber to subsequently establish flow of fluid to the pressure loading zone, whereby sealing pressure on said sealing member is delayed until after the motor starts.

2. In a hydraulic system including a motive fluid line, a rotary type fluid-driven pressure sealed motor in said line, said motor comprising a housing defining a rotor chamber, rotor means in said chamber, a fluid inlet communicating pressure fluid from said line to a pressure side of the chamber, a low pressure fluid discharge outlet for delivering to said line fluid from a fluid discharge side of said chamber, and a pressure sealing member in said motor adapted to be urged into sealing contact with a confronting portion of said rotor means, an improved construction to control said pressure member, comprising: a pressure actuated valve for communicating fluid from said line to said pressure sealing member and controlling an interconnection therebetween; flow sensitive means connected in said line for actuating said valve and responsive to the fluid in said line reaching a predetermined flow, to subsequently apply actuating pressure to said valve whereby sealing pressure on said pressure member is delayed until after the motor starts; and an orificed duct connected to said sealing member and affording limited flow from said sealing member in a path communicating with said low pressure discharge.

3. In a hydraulic system including a motive fluid line and a rotary type fluid-driven pressure sealed motor in said line, said motor including a housing defining a rotor chamber, rotor means therein, and a pressure sealing member in said motor defining one side of a pressure loading zone and adapted to be urged by pressure from that side into sealing engagement with a confronting portion of said rotor means, an improved construction to control said pressure member comprising: means including a pressure actuated valve for communicating fluid from said line to said pressure loading zone and controlling an interconnection therebetween; and flow sensitive means connected in said line for actuating said valve and responsive to the fluid in said line approaching a predetermined flow, to subsequently apply actuating pressure to said valve whereby sealing pressure on said pressure member is delayed until after the motor starts.

4. The construction in a hydraulic system as described in claim 3, wherein said flow sensitive means comprises a flow restriction structure formed of a bore interposed in said line and a head portion of said valve extending in an upstream blocking direction within said bore.

5. The construction in a hydraulic system as described in claim 3 wherein the flow sensitive means is formed in part by a head element in said valve which projects upstream in said line at a point restricting the fluid flow so as to reduce the pressure and which has an effective longitudinally acting pressure area acting to move said valve in response to pressure upstream of said point.

6. The construction in a hydraulic system as described in claim 3 wherein the flow sensitive means comprises a venturi device interposed in said line and having differential transmitting connections connected to opposite areas of said valve in a manner causing it to open and to increase the opening of said interconnection in response to increasing flow of fluid in said motive fluid line.

7. In a system including a main fluid line, and a pressure sealed motor in said line having a pressure loading zone into which the pressure for sealing is introduced, the improvement comprising a by-pass line of limited flow connectible to upstream and downstream points in the main line for by-passing the motor to a limited extent, said by-pass line having a tapped point therein connected to the pressure loading zone of the motor to introduce a control pressure thereto, a pressure operated valve and a restriction connected in said by-pass line on opposite sides of the tapped point for regulating the flow so as to control the pressure developed therebetween, and flow sensitive means responsive to flow in said main line to actuate said valve, and sensitive to fluid flow in said line at or above a predetermined rate to apply actuating pressure to said valve to introduce increased control pressure to the loading zone only after the rotor attains a predetermined rotational speed.

8. In a system including a fluid flow line, unitary motor and valve means in said line comprising a single housing common to the motor and to the valve means and connected in said line, there being a main section of said housing defining a rotor chamber, rotor means therein, said chamber having a fluid inlet communicating pressure fluid from said line to a pressure side of said rotor means and having a low pressure fluid discharge outlet for delivering to said line fluid from a flow discharge side of said rotor means, and an end plate secured to the main section of the housing: the combination, with the end plate, comprising a pressure sealing member beside said end plate and capable, under the force of sealing pressure thereagainst, of being urged into sealing engagement with a confronting portion of said rotor means, a valve bore in said end plate having a communication for leading fluid supplied from the line thereto, a duct connected with the fluid inside said bore and connected with the pressure sealing member to cause pressure corresponding to bore pressure to be transmitted and applied as sealing pressure to said member, and flow sensitive means comprising a valve shiftable in said bore to control opening and closing of said duct, said valve being effective to establish flow of fluid to the pressure loading zone after flow in the line starts the motor.

9. In a system including a fluid flow line through which motive fluid flows under pressure: unitary motor and valve means in said line comprising a single housing common to the motor and valve means and connected in said line, there being a main section of said housing defining a rotor chamber, rotor means therein, said chamber having a fluid inlet communicating pressure fluid from said line to a pressure side of said rotor means and having a low pressure fluid discharge outlet for delivering to said line fluid from a flow discharge side of said rotor means, an end plate secured to the main section of the housing, a pressure sealing member beside said end plate and capable, under the force of sealing pressure thereagainst, of being urged into sealing engagement with a confronting portion of said rotor means, a valve bore in said end plate, a duct connected with the fluid inside said bore and connected with the pressure sealing member to apply sealing pressure from said bore thereto, flow sensitive means comprising a valve and shiftable in said bore to control opening and closing of said duct, said valve having a head which head projects in an upstream direction with respect to line fluid flow and which head has an effective longitudinally acting pressure area exposed to said fluid and acting to move said valve in a direction of increased opening of said duct in response to increasing flow in said line, and flow restricting means comprising a bleed connection to said duct and affording limited flow from said pressure sealing member in a path communicating with said low pressure fluid discharge outlet.

10. In a system including a fluid flow line through which motive fluid is conducted under pressure: unitary motor and valve means in said line, comprising a single housing common to the motor and to the valve means and connected in said line for receiving the full flow therethrough, there being a main section of said housing defining a rotor chamber, rotor means therein, an end plate secured to the main section of the housing, a pressure sealing member beside said end plate and defining one side of a pressure loading zone for being urged by pressure therein into forced sealing engagement with a confronting portion of said rotor means, a valve bore in said end plate, a duct connected with the fluid inside said bore and connected with the pressure loading zone to apply sealing pressure from said bore to said sealing member, and flow sensitive means comprising a valve and shiftable in said bore to control opening and closing of said duct, said valve having a head which head projects in an upstream direction with respect to the line fluid flow and which head has an effective longitudinally acting pressure area exposed to upstream pressure of said fluid and acting to move said valve in a direction of increased opening of said duct in response to increasing flow in said line.

11. A unitary motor and valve means as described in claim 10 wherein said valve is a differential pressure opened sliding valve, there being means controlling said valve comprising the longitudinally acting pressure area thereof exposed to upstream pressure, a spring in engagement with said valve acting opposite to said longitudinally acting pressure area, and means receiving said upstream pressure in a manner creating a pressure reduction and applying said reduced pressure to the valve in a direction opposite to the longitudinally acting pressure area so as to create the desired pressure differential on said valve.

12. Unitary motor and valve means as described in claim 11, and further including restriction means connected to said pressure loading zone for continuously draining same into a low pressure zone in said line so as to bleed down the pressure against the pressure sealing member at all times when said duct is closed by the valve.

13. Unitary motor and valve means as described in claim 12, wherein said means creating said pressure reduction comprises a fixed venturi.

14. In a hydraulic system including a motive fluid line, a rotary type fluid-driven pressure sealed motor in said line, said motor comprising a housing defining a rotor chamber, rotor means in said chamber, a fluid inlet communicating pressure fluid from said line to a pressure side of the chamber, a low pressure fluid discharge outlet for delivering to said line fluid from a fluid discharge side of said chamber, and a pressure sealing member in said motor adapted to be urged into sealing contact with a confronting portion of said rotor means, an improved construction to control said pressure sealing member, comprising: a pressure actuated valve in communication with said motive fluid line and with said pressure sealing member, and volume flow responsive means in communication with said line effective to control said valve in response to a change in volume fluid flow through the line.

15. The improved construction described in claim 14, in which the flow responsive means consists of a restriction in said motive fluid line.

16. In a hydraulic system including a motive fluid line and a rotary type fluid-driven pressure sealed motor in said line, said motor including a housing defining a rotor chamber, rotor means therein, and a pressure sealing member in said motor defining one side of a pressure loading zone and adapted to be urged by pressure from that side into sealing engagement with a confronting portion of said rotor means, an improved construction to control said pressure sealing member comprising: a flow-sensitive valve in communication with said motive fluid line and said pressure sealing member, and effective to control the pressure applied to said pressure sealing member in response to changes in the volume of fluid flowing in said motive fluid line.

17. In a system including a fluid line and a fluid pressure loaded rotary motor connected in said line so as to receive a flow of fluid and having means forming a return for the fluid back into the line, a plate in said motor including a pressure loading chamber and a cooperating rotor sealing member urged by pressure from said chamber so as to move said member to seal against the rotor in said motor, an improved structure comprising: valve means in said plate for communicating fluid from said line to the pressure loading chamber and controlling an interconnection therebetween; said chamber having a restricted flow path directed through said plate into said return; flow sensitive means connected in said line for actuating said valve means and responsive to the fluid in said line reaching a predetermined flow, to actuate said valve means thereby opening said interconnection following the period of delay to reach said predetermined flow; said valve means comprising a valve spool and a valve spool bore in said plate shiftably receiving said valve spool, said return intersecting a portion of said bore which receives said valve spool.

18. The structure of claim 17, wherein said restricted flow path is the leakage path leading between the spool and its bore into the return.

19. In a hydraulic system which includes a high pressure fluid conducting zone which in turn includes a pressure sealed fluid driven motor interposed therein, said motor having a rotor, a sealing member for sealing against a face of the rotor, and a pressure loading zone into which liquid from the high pressure zone is introduced to urge the sealing member into sealing engagement with the rotor face, the volume flow of pressurized liquid through said high pressure zone being dependent on and substantially proportional to the rotational speed of said rotor, the improvement which comprises:
a pressure differential actuated valve in communication with said high pressure zone and with said pressure loading zone, and responsive to low volume flow of fluid through said high pressure zone, which accompanies starting and low rotor speeds, to maintain the pressure in said pressure loading zone at a value insufficient to provide a sealing force against the sealing member, and responsive to the higher volume flow of fluid through said high pressure zone, which accompanies increase of rotor speed to normal operating speed, to maintain the pressure in said pressure loading zone at a value sufficient to provide an effective sealing force against said sealing member.

20. In a pressure loaded fluid motor which includes a housing defining a rotor chamber, a rotor therein, a fluid inlet communicating with a fluid pressure zone in the chamber, a fluid outlet communicating with a fluid discharge pressure zone in the chamber, a sealing member between an end face of the rotor and the adjacent end of the housing, at least a portion of the sealing member being capable of being moved into flat sealing contact with the adjacent end face of the rotor, and a pressure loading zone between the opposite or outer face of the sealing member and the adjacent end of the housing into which fluid under pressure may be introduced to urge the sealing member into sealing contact with the rotor end face, the improved construction which comprises: means including a pressure responsive valve in communication with said fluid inlet to maintain a sub-sealing pressure in said pressure loading zone during starting and slow speed rotation of said rotor, and responsive to an increase in rotor speed to increase the pressure in said pressure loading zone, and to thereafter maintain the pressure within a predetermined range in said loading zone during any period in which the rotor is rotating at normal operating speeds.

21. The construction described in claim 20 in which said valve is also capable of reducing the pressure in said pressure loading zone to a sub-sealing pressure in response to a reduction in rotor speed to a speed below normal operating speed.

References Cited by the Examiner

UNITED STATES PATENTS

| 2,512,025 | 1/50 | Lauck | 103—126 |
| 2,627,232 | 2/53 | Lauck | 103—126 |
| 2,769,394 | 11/56 | Lauck | 103—126 |
| 2,845,868 | 8/58 | Norlin | 103—11 |
| 2,845,873 | 8/58 | Lapsley | 103—216 |
| 2,915,976 | 12/59 | Demtchenko | 103—126 |
| 2,915,977 | 12/59 | Campbell | 103—126 |
| 2,924,182 | 2/60 | Blasutta et al. | 103—216 |
| 2,977,886 | 4/61 | Banker | 103—11 |
| 3,068,795 | 12/62 | Lauck | 103—126 |
| 3,076,414 | 2/63 | Adams | 103—216 |

JOSEPH H. BRANSON, Jr., Primary Examiner.

KARL J. ALBRECHT, Examiner.